(12) United States Patent
Venema et al.

(10) Patent No.: US 11,423,187 B2
(45) Date of Patent: Aug. 23, 2022

(54) SECURITY DEVICE AND FIELD BUS SYSTEM FOR SUPPORTING SECURE COMMUNICATION BY MEANS OF A FIELD BUS

(71) Applicants: Phoenix Contact GmbH & Co. KG, Blomberg (DE); ABB Schweiz AG, Baden (CH)

(72) Inventors: Guido Venema, Detmold (DE); Patrick Lessing, Berlin (DE); Michael Hotz, Hamburg (DE); Stefan Bollmeyer, Minden (DE); Ragnar Schierholz, Minden (DE); Bernd Wansner, Minden (DE); Marten Hinrichs, Porta Westfalica (DE)

(73) Assignees: Phoenix Contact GmbH & Co. KG, Blomberg (DE); ABB SCHWEIZ AG, Baden (CH)

(*) Notice: Subject to any disclaimer, the term of this patent is extended or adjusted under 35 U.S.C. 154(b) by 377 days.

(21) Appl. No.: 16/472,811

(22) PCT Filed: Dec. 21, 2017

(86) PCT No.: PCT/EP2017/084257
§ 371 (c)(1),
(2) Date: Jun. 21, 2019

(87) PCT Pub. No.: WO2018/115378
PCT Pub. Date: Jun. 28, 2018

(65) Prior Publication Data
US 2019/0370505 A1   Dec. 5, 2019

(30) Foreign Application Priority Data

Dec. 22, 2016  (DE) .......................... 102016125511.4

(51) Int. Cl.
*G06F 21/86* (2013.01)
*G06F 21/60* (2013.01)
(Continued)

(52) U.S. Cl.
CPC ............ *G06F 21/86* (2013.01); *G06F 21/602* (2013.01); *G06F 21/85* (2013.01); *H04L 9/0897* (2013.01)

(58) Field of Classification Search
CPC ........ G06F 21/86; G06F 21/602; G06F 21/85; H04L 9/0897; G05B 2219/25428
See application file for complete search history.

(56) References Cited

U.S. PATENT DOCUMENTS

2005/0216726 A1* 9/2005 Dellmo ............... H04W 12/033
                                                       713/151
2007/0067458 A1   3/2007 Chand
(Continued)

FOREIGN PATENT DOCUMENTS

DE        10248100 A1    4/2004
DE    102011007571 A1   10/2012
(Continued)

OTHER PUBLICATIONS

Andersson et al., WO 2013/129987 A1 [online][retrieved on Nov. 6, 2021]. Retrieved from: https://worldwide.espacenet.com/ (Year: 2012).*
(Continued)

*Primary Examiner* — Jung W Kim
*Assistant Examiner* — Sangseok Park
(74) *Attorney, Agent, or Firm* — Kaplan Breyer Schwarz, LLP

(57) ABSTRACT

A security device to support secure communication via a field bus, has a connecting apparatus for the direct coupling of the security device to a network interface of a field bus subscriber, which is formed for connecting to a field bus and (Continued)

which is not formed for secure communication via the field bus. In the coupled state, there is a link between the security device and the field bus subscriber such that, if the link is disconnected or damaged, proper operation of the security device is reversibly or irreversibly blocked. Further, a transmitting and receiving apparatus is provided which is formed to securely transfer data coming from a directly coupled field bus participant, which is not formed for secure communication, via the field bus according to a predetermined security protocol, and which is further formed to receive data transferred via the field bus and intended for the field bus participant according to the predetermined security protocol and to deliver them to the field bus participant.

15 Claims, 3 Drawing Sheets

(51) Int. Cl.
  *G06F 21/85* (2013.01)
  *H04L 9/08* (2006.01)

(56) References Cited

U.S. PATENT DOCUMENTS

| | | |
|---|---|---|
| 2008/0168118 A1 | 7/2008 | Hickey et al. |
| 2010/0235575 A1 | 9/2010 | Yasaki et al. |
| 2014/0041061 A1* | 2/2014 | Falk ................ G06F 21/87 726/34 |
| 2015/0095635 A1* | 4/2015 | Miller ................ H04L 63/168 713/152 |
| 2015/0254677 A1* | 9/2015 | Huxham ............... G06F 21/10 705/57 |

FOREIGN PATENT DOCUMENTS

| | | |
|---|---|---|
| DE | 102014110385 A1 | 1/2016 |
| EP | 0437697 A2 | 7/1991 |
| EP | 1496666 A1 | 1/2005 |
| EP | 1640836 A1 | 3/2006 |
| EP | 1903411 A1 | 3/2008 |
| EP | 2056535 A2 | 5/2009 |
| EP | 2320285 A1 | 5/2011 |
| EP | 2940541 A2 | 11/2015 |
| JP | 2010-238216 A | 10/2010 |
| WO | 2014/206451 A1 | 12/2014 |
| WO | 2016/018622 A1 | 2/2016 |
| WO | 2016/075260 A1 | 5/2016 |

OTHER PUBLICATIONS

Belden Tofino 104 Security Enforcer, http://www.belden.com/docs/upload/Tofino-Xenon-IEC-104-Enforcer-Loadable-Security-Module-LSM.pdf.
Checkpoint industrial Firewall with DPI for Industrial Protocols, https://www.checkpoint.com/products/industrial-control-systems-appliances/.
Authorized Officer: Nora Lindner, English Translation of International Report on Patentability issued in corresponding PCT application No. PCT/EP2017/084257, dated Jul. 4, 2019, 9 pp.
Office Action dated Sep. 2, 2020 in related Japanese Patent Application No. 2019-534095 and English Translation thereof.
Authorized Officer: Barrio Baranano, Ainhoa, International Search Report issued in PCT application No. PCT/EP2017/084257, dated Mar. 2, 2018, 13 pp.
Office Action issued in German patent application No. 102016125511.4, dated Oct. 4, 2017, 10 pp.

* cited by examiner

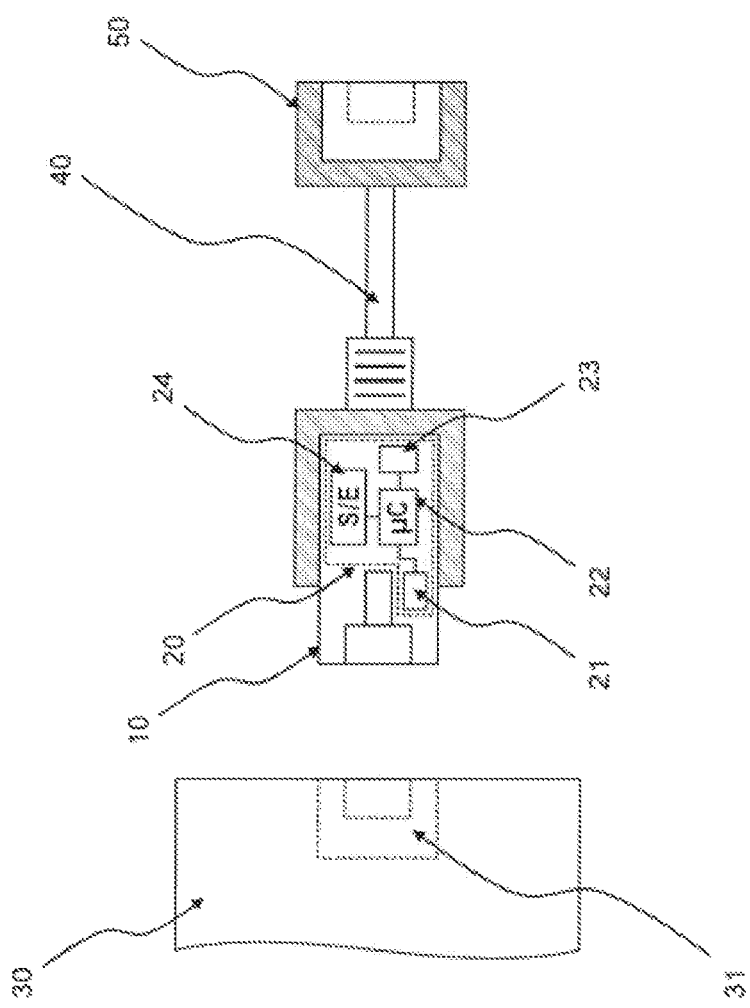

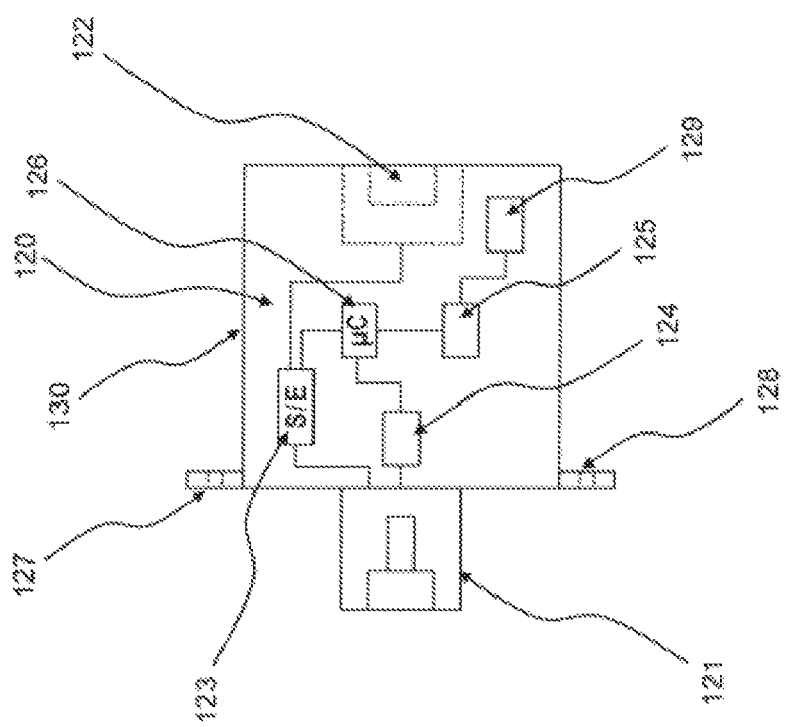

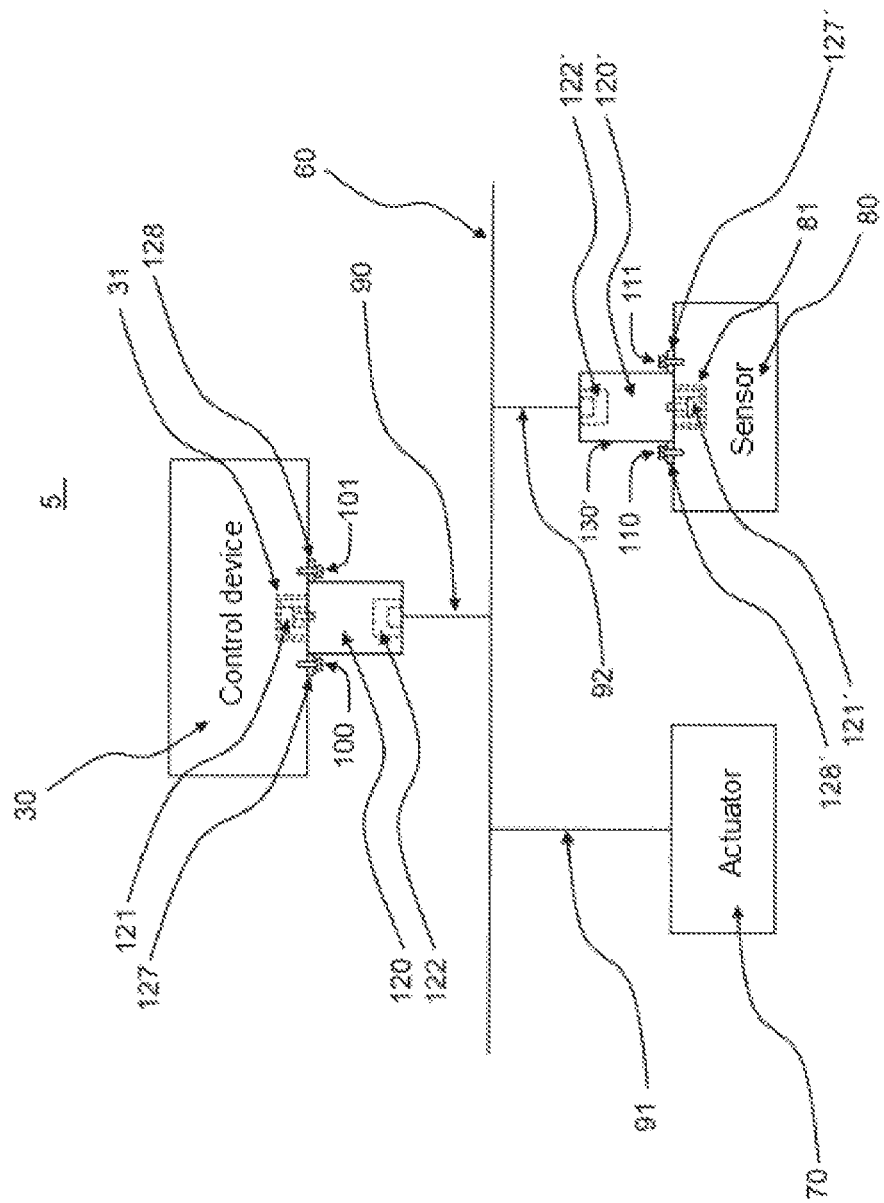

SECURITY DEVICE AND FIELD BUS SYSTEM FOR SUPPORTING SECURE COMMUNICATION BY MEANS OF A FIELD BUS

FIELD

The invention relates to a security device and a field bus system to support a secure communication by means of a field bus.

BACKGROUND

Communication security in information and communication technology is now playing an increasingly important role in the entire cyberspace and thus also in industrial automation technology.

From the EP 2 940 541 A2, a measure is known with which a secure communication can be offered to a conventional device within a micro network (Microgrid). For this purpose, a security device is connected between a conventional local device and a remote connection, which is formed as a BITW (bump-in-the-wire) device. Such BITW devices are switched on and managed as separate and independent units.

Existing field bus network protocols such as Modbus, PROFONET, Ethernet/IP, HART or Foundation Field bus protocols do not contain any security mechanisms or functions, i.e. security mechanisms with which communication links between two or more subscribers can be protected against external attacks, for example. Known security functions that ensure communication security and, in particular, the protection of the exchange of information between subscribers are, for example, authentication algorithms. Algorithms for integrity protection or encryption and decryption algorithms. Up to now, the known field bus networks have been protected with the help of firewalls or application gateways arranged in the periphery, so that trustworthy zones are created within which communication, however, is insecure.

From the DE 102 48 100A1 a security-related device for the connection of field devices to a security-related field bus is known. For this purpose, a field bus plug, which has a security-related field bus interface that enables the transfer of security-related signals via the field bus to a control system. The security-related signals correspond to the required security categories and thus safety aspects. In addition, the field bus plug has a security-related, field bus-neutral device interface to which a security field device with a security-related, field bus-neutral field bus interface can be connected. Thanks to the special field bus plug, which has both a security-related, field bus-neutral field bus station and a security-related, but field bus-dependent field bus interface, field devices only have to be developed for a security-related, field bus-neutral field bus interface.

SUMMARY

The invention is based on the object to create a security device and a field bus system with which it is possible to give field bus subscribers, that do not have a security function, the possibility to communicate securely via a field bus.

The technical problem mentioned above is solved by the features of claim 1.

Accordingly, a security device is provided for the support of a secure communication via a field bus. The security device has a connecting apparatus for the direct coupling of the security device to a field bus-formed network interface of a field bus subscriber which is not formed for a secure communication via the field bus. This means that the field bus subscriber does not have any security functionality for safeguarding a communication. In other word: the field bus subscriber that does not have a security functionality for securing a communication, is not technically capable to protect an information exchange between itself and at least one other field bus subscriber.

The security device is formed in such a way that in the coupled state between the security device and the field bus subscriber, which is not formed for secure communication via the field bus, there is a link in such a way that after disconnection or damage to the coupling, the proper operation of the security device is reversibly or irreversibly blocked. The security device also has a network interface for connecting the security device to the field bus. The security device further has a transmitting and receiving apparatus which is formed to securely transfer data coming from a directly coupled field bus subscriber which is not formed for secure communication via the field bus according to a predetermined security protocol. Furthermore, the transmitting and receiving apparatus is formed to receive, via the field bus, data determined for the field bus subscriber according to the predetermined security protocol and to deliver them to the field bus subscriber as non-secure.

A predetermined security protocol is a protocol that protects a communication link or information exchange between two or more subscribers. For example, the predetermined security protocol regulates authentication, integrity protection, data encryption or data decryption. Thus, the security device is preferably formed to perform an authentication method and/or to perform at least one cryptographic algorithm according to the predetermined security protocol to ensure secure communication, e.g. protected against external attacks.

Depending on the predetermined security protocol, the transmitting and receiving apparatus can also be formed for decrypting encrypted data received via the field bus and for encrypting data to be transferred from a connected field bus subscriber which is not formed for secure communication via the field bus.

In order to execute cryptographic algorithms, the security device can have a secure storage apparatus for storing cryptographic keys. Programs for the execution of security functions according to the predetermined security protocol can also be stored in the secure storage apparatus.

At this point it should already be mentioned that the security device can be adapted to changing security protocols for communication security. For this purpose, the security device can have a programming interface that allows appropriate programming of the security device. However, it is also conceivable that the security device can be updated via the field bus.

Advantageously, the security device has a control apparatus and a monitoring apparatus formed to monitor the link between the security device and a connected field bus subscriber. The control apparatus is formed to block the appropriate operation of the security device in response to an error signal from the monitoring apparatus. Such an error signal can be triggered by the security device if the security device is disconnected appropriately, i.e. without damage, or by force from the coupled field bus subscriber.

An advantageous further embodiment provides that the security device is integrated in a plug connector, in particular in an RJ45 plug.

Advantageously, the control apparatus can be formed to erase at least one of the cryptographic keys saved in the secure storage apparatus and/or irreversibly or reversibly block the connecting apparatus and/or the network interface of the security device in response to an error signal from the monitoring apparatus.

Due to this measure it is ensured that the security device can only, if at all, continue to be operated if a disconnection or damage of the coupling with the field bus subscriber is determined, when an operator releases the security device again, e.g. if the previously deleted cryptographic keys are resaved and/or the locked network interface and/or connecting apparatus is unlocked.

Expediently, the power supply of the security device occurs via the field bus, for example, by means of the known Power-Over-Ethernet technology, and/or by means of an internal power supply source and/or via a connected field bus subscriber and/or by means of Energy Harvesting technologies.

In the case that a field bus subscriber which is not formed for secure communication via the field bus and which is already coupled to the security device is to be enabled for non-secure communication via the field bus, the transmitting apparatus and receiving apparatus can be formed to transparently conduct data from the connected field bus subscriber to the field bus.

Preferably, a field device or a control device can be linked to the security device as a field bus subscriber.

The predetermined security protocol contains several defined security functions, such as authentication functions, encryption functions and integrity backup functions, which can be deployed as a separate protocol stack or integrated in a field bus protocol.

The above-mentioned technical problem is also solved by the features of claim 12.

Accordingly, a field bus system is provided for the support of secure communication via a field bus. The field bus system comprises a field bus, at least one first field bus subscriber which has a network interface formed for switching on to the field bus, wherein the at least one first field bus subscriber is not formed for secure communication via the field bus. The at least one first field bus subscriber is connected to a security device which has been previously defined, wherein the security device is formed for secure communication according to a predetermined security protocol.

Advantageously, the at least one field bus subscriber and the security device coupled thereto are managed in the field bus system as a single field bus subscriber, for example if a common address is assigned to the at least one field bus subscriber and the security device coupled thereto.

Advantageously, a second field bus subscriber is connected to the field bus which is formed for secure communication with the security device of the at least one first field bus subscriber according to the predetermined security protocol.

In order to establish a stable and reliable coupling between the at least one first field bus subscriber and the at least one security device, the security device is detachably or non-detachably linked to the at least one first field bus subscriber. A detachable link is understood to be, for example, a bolted joint, whereas a non-detachable link can be, for example, a riveted, weld or adhesive joint.

According to an advantageous embodiment, at least one first field bus subscriber can be formed as a field device or control device and at least one second field bus subscriber as a field device or control device. A field device can, for example, be a sensor or actuator, while a control device can, for example, be a PLC (Programmable Logic Controller) or a DCS (Distributed Control System).

BRIEF DESCRIPTION OF THE DRAWINGS

The invention will be explained in more detail below using a few exemplary embodiments in conjunction with the accompanying drawings. In which:

FIG. 1 is an exemplary security device for supporting a secure communication via a field bus, which is integrated in an RJ45 connector, FIG. 2 is another exemplary security device, and FIG. 3 is an exemplary field bus system in which the invention is implemented.

DETAILED DESCRIPTION

FIG. 1 shows an exemplary security device 20 for supporting a secure communication via a field bus 60, which is exemplarily shown in FIG. 3. In other words: The security device 20 is used for securing communication via the field bus 60, for example to protect an information exchange against external attacks. As FIG. 1 exemplarily shows, the security device 20 can be integrated in a plug connector, in particular in an RJ45 plug 20.

The security device 20 has a connecting apparatus 10 for the direct coupling of the security device 20 with a network interface 31 of a field bus subscriber 30 which is not formed for secure communication via the field bus 60 and is formed for connection to the field bus 60. In other words, the field bus subscriber 30 does not have any security functionalities for securing of a communication. The network interface of the field bus subscriber 30 is preferably an RJ45 socket into which the RJ45 plug housing the security device 20 can be inserted. The RJ45 plug 10 and the RJ45 socket can be mechanically coupled to each other either detachably or non-detachably.

In the coupled state, as shown for example in FIG. 3, there is a link or coupling between the security device 20 and the field bus subscriber 30 such that, in the event of disconnection or damage to the coupling, the proper operation of the security device 20 is reversibly or irreversibly blocked.

It is conceivable that the security device 20 can be riveted to the field bus subscriber 30, so that an attempt to remove the security device 20 from the field bus subscriber 30 will damage the security device 20 to such an extent that proper operation is irreversibly blocked. Advantageously, the field bus subscriber 30 will not be damaged when removing the security device 20, or will not be damaged in such a way that it is no longer functional.

The security device 20 has a network interface 50 for connecting to the Field bus 60. Preferably, the network interface 50 is an RJ45 socket which can be linked to the security device 20 via a cable 40. Furthermore, a transmitting apparatus and receiving apparatus 24 is deployed in the security device 20, which is formed to securely transfer data coming from a directly coupled field bus subscriber, for example the field bus subscriber 30, which is not formed for secure communication, via the field bus 60 according to a predetermined security protocol. The transmitting apparatus and receiving apparatus 24 are further formed to receive data transferred via the field bus 60 and determined for the field bus subscriber 30 according to the predetermined security protocol, to unlock them subsequently and to deliver them to the field bus subscriber 30. In this way, the exchange of information via the field bus 60, for example, can be protected against external attacks.

The security device 20 can have a control apparatus 22, which can be formed as a microcontroller. Furthermore, a monitoring apparatus 21 can be provided to monitor the electrical and/or mechanical link between the security device 20 and a connected field bus subscriber, such as the field bus subscriber 30, wherein the control apparatus 22 is formed to block proper operation of the security device 20 in response to an error signal of the monitoring apparatus 21. Such an error signal can be triggered by the security device 20 if the security device 20 is disconnected properly, i.e. without damage, or by force from the coupled field bus subscriber 30.

The monitoring apparatus 21, for example, can be formed as a pressure sensor that detects when the security device 20 is coupled to the field bus subscriber 30. It is also conceivable that the monitoring apparatus 21 is formed to detect a current flow when the security device 20 is connected to field bus subscriber 30.

Depending on the predetermined security protocol, the transmitting and receiving apparatus 24 can be formed for decrypting encrypted data received via the field bus 60 and for encrypting data to be transferred by a connected field bus subscriber, for example the field bus subscriber 30, which is not formed for secure communication via the field bus. Additionally, or optionally, the security device 20 can be formed for carrying out an authentication method and/or at least one cryptographic algorithm according to the predetermined security protocol.

In order to encrypt data and execute a cryptographic algorithm, the security device 20 has a secure storage apparatus 23 in which cryptographic keys can be stored. In the secure storage apparatus 23 or a separate storage apparatus, programs can also be stored that can be executed for performing security functions according to the predetermined security protocol of control apparatus 22. A Hardware Security Module (HSM) can be used as a secure storage apparatus.

The predetermined security protocol contains a plurality of security functions which can be executed by the security device 20 and which are known or still being developed. In particular, the predetermined security protocol is capable of supporting security functions for communication security independent of a protocol layer, for example of the 7-layer OSI model. An exemplary security function can support the performance of a MAC (Message Authentication Code) algorithm on layer 2. Another security function can support Transport Layer Security (TLS) for TCP-based protocols. Another security function can support endpoint authentication and session key management on an application layer of the OSI layer model.

The security protocol, comprising a plurality of security functions, can be formed as a separate protocol stack or integrated into a field bus protocol that can be stored in the security devices.

Control apparatus 22 can be formed to erase at least one of the cryptographic keys saved in the secure storage apparatus 23 in response to an error signal from the monitoring apparatus 21. In this way, the functionality of the security device 20 can be reversibly blocked. In the event that the security device 20 continues to be used, the deleted cryptographic key or a newly defined key can be written into storage 23 again. For this purpose, the security device 20 can have a programming interface for external programming. The programming interface can also be used to adapt the security device 20 to changing security protocols. In order to irreversibly block the functionality or proper operation of the security device 20, it can be provided that the control apparatus 22 is formed to irreversibly or reversibly block the connecting apparatus 10 and/or the network interface 50 in response to an error signal from the monitoring apparatus 21.

The power supply of the security device 20 can be provided via the field bus 60, and/or via an internal power supply source (not represented), and/or via a connected field bus subscriber, e.g. field bus subscriber 30, and/or via energy harvesting technologies. A power supply of the security device 20 via the field bus 60 can, for example, be achieved with the known Power-over-Ethernet technology. A battery can be used as the internal power supply source.

For example, the field bus subscriber 30 shown in FIG. 1 can be a control device. However, a field device, such as a sensor or actuator, can also be connected to the security device 20 as a field bus subscriber.

FIG. 2 shows an alternative security device 120, which is housed in a housing 130. It should be noted here that the functioning and construction of the security device 120 can essentially correspond to the functioning and construction of the security device 20, so that, in order to avoid repetitions, reference is made to the discussions regarding the security device 20.

Two flanges 127 and 128 can be arranged on the housing 130, in each of which an opening is provided through which, for example, a screw or a rivet for coupling the security device 120 to a field bus subscriber can be passed. The security device 120 has a connecting apparatus 121 for the direct coupling of the security device 120 with a network interface of a field bus subscriber, for example the field bus subscriber 30, which is not formed for secure communication via the field bus, formed for connecting to a field bus. The connecting apparatus 121 can be formed as an RJ45 plug, which is led out of the housing 130 of the security device 120. Furthermore, the security device 120 has a network interface 122 for connecting the security device 120 to the field bus 60. The network interface 122 can be formed as an RJ45 socket into which an RF-45 plug of a network cable can be inserted to link the security device 120 to the field bus 60.

Again, as depicted in FIG. 3, an electrical and mechanical link exists in the coupled state between the security device 120 and the field bus subscriber 30 in such a way that, in the event of disconnection or damage to the coupling, the proper operation of the security device 120 is reversibly or irreversibly blocked. The security device 120 also has a network interface 122 for connecting the security device 120 to the field bus 60, as also depicted in FIG. 3. Furthermore, the security device 120 has a transmitting/receiving apparatus 123 which is formed to securely transfer data coming from a directly coupled field bus subscriber, for example the field bus subscriber 30, which is not formed for secure communication, via the field bus 60 according to a predetermined security protocol. Furthermore, the transmitting apparatus and receiving apparatus 123 is formed to receive data transferred via the field bus 60 and determined for the field bus subscriber 30 according to the predetermined security protocol and to deliver them to the field bus subscriber 30.

Similar to the security device 20, the security device 120 can have a monitoring apparatus 124, a secure storage 125 and a control apparatus 126, which is formed, for example, as a microcontroller. A programming interface 129 can be provided for programming the security device 120. A computer can be connected to this programming interface 129, for example, via which, for example, cryptographic keys can be written to the secure storage 125. The security device 120 can also be adapted to changing security protocols via the programming interface 129. The corresponding security functions can also be deposited in the secure storage 125 or a separate storage (not represented). The microcontroller 126 can access the cryptographic keys and programs deposited in the secure storage 125 in order to execute the corresponding security functions.

FIG. 3 shows an exemplary field bus system 5 for supporting a secure communication via the field bus 60.

The field bus system 5 has the field bus 60 as well as at least one first field bus subscriber 80, which has a network interface 81, which is formed for switching on the field bus subscriber 80 to the field bus 60. The at least one first field bus subscriber 80, which can be a sensor, for example, is not formed for secure communication via field bus 60. In other words, the field bus subscriber 80 does not include any security functionality to secure communication and therefore no security functionality to secure communication via field bus 60.

At least one first field bus subscriber 80 is connected to a 120' security device via the network interface 81. The 120' security device is formed for secure communication according to a predetermined security protocol. In other words, a security functionality is deployed in the 120' security device which can, for example, perform authentication, integrity protection, data encryption and data decryption in order to secure communication to and from the field bus subscriber 80, in particularly against external attacks.

The security device 120' can be a security device which is essentially identical in structure and functionality to the security device 120 shown in FIG. 2. The security device 120' thus has a transmitter/receiver unit and a network interface 122' for connecting to field bus 60 and a connection interface 121' for mechanical and electrical linking to the field bus subscriber 80. Optionally, the 120' security device can have a control apparatus, a monitoring apparatus, a secure storage apparatus and a programming interface. The security device 120' can be housed in a housing 130', on which two flanges 127' and 128' can be arranged. The flanges 127' and 128' each have an opening through which a screw 111 or 110 or a rivet for mechanical coupling with the field bus subscriber 80 can be passed. In the field bus subscriber 80, corresponding recesses can be provided for accommodating the screws. A network cable 92 is linked to the network interface 122' of the security device 120' for connection of the security device 120' to the field bus 60.

On field bus 60, another field bus subscriber 70, formed, for example, as an actuator, can be connected via a network cable 91. The field bus subscriber 70, unlike the field bus subscriber 80, is formed for secure communication via field bus 60. In other words: The security functions of the predetermined security protocol are already deployed in the field bus subscriber 70.

For example, the control device 30 shown in FIG. 1 is also connected to the fieldbus 60 via the security device 120 shown in FIG. 2. The security device 120, for example, is not detachably connected to the control device 30 via screws 100 and 101 that pass through the openings in flanges 127 and 128 of the housing 130. As shown further in FIG. 3, the security device 120 is also connected to the fieldbus 60 via a network cable 90. For this purpose, the network cable 90 is connected to the network interface 122 of the security device 120.

According to an advantageous further embodiment, the security device 120 and the security device 122' can also be connected to the control device 30 or the sensor 80 in a non-detachable way via a riveted joint. Such a mechanical coupling ensures that the respective security device cannot be removed from the respective field bus subscriber without destroying or damaging the network interface 122 or 122'. Such a riveted joint thus ensures that the functionality of the security device 120 or 120' is irreversibly blocked after removal. This means that the security device can no longer be used.

As already mentioned, the security devices 120 and 120' can, for example, be supplied with power via the field bus 60 by means of the known Power-Over Ethernet technology. Alternatively, or additionally, the security device 120 can be supplied with power by the control device 30 and the security device 120 by the sensor 80. Alternatively, or additionally, each security device can have its own internal power supply, for example in the form of a battery. In addition, the known energy harvesting technologies can also be used to supply the security devices 120 and 120' with power.

It should also be noted that the security devices 20, 120 and 120' can be considered as so-called hardware security modules in which security algorithms, random number generators and encryption algorithms can be deployed according to a predetermined security protocol.

With the exemplary field bus system 5 it is possible, among other things, to transfer encrypted data from the sensor 80 to the control device 30. For this purpose, the data transferred from sensor 80 to security device 120' is encrypted according to a security function and transmitted to security device 120 via the field bus. The security device 120 decrypts the received data and transmits it to the control apparatus 30 unencrypted. In a similar way, data can be transmitted in encrypted form from actuator 70 to security device 120 and then delivered in decrypted form to the control apparatus 30. In a similar way, data determined by the control apparatus 30 for the sensor 80 are first transmitted in encrypted form from the security device 120 via the field bus 60 to the security device 120. The received data are then decrypted by the security device 120' and delivered to the sensor 80. Furthermore, the security devices 120 and 120' and the actuator 70 can be adapted to perform mutual authentication according to the predetermined security protocol.

Thanks to the security devices 120 and 120', it is now possible to enable secure communication, for example protected against external attacks, between the field bus subscribers 70 and 80 and the control device 30 via the field bus 60, even if the control device 30 and the field bus subscriber 80 themselves have no communication security measures.

It is conceivable that proper operation of security device 120 will only be reversibly blocked if the security device 20 together with the control device 30 is disconnected from the field bus 60 without the control device 30 being removed from the security device 120. In this case, the proper operation of the security device 120 can be reactivated by a targeted intervention of an operator, so that the control device 30 can be re-connected to the field bus 60 and operated with the coupled security device 120.

In the event that security functions of a predetermined security protocol have not yet been saved or unlocked in the security devices 120 and 120', the transmitting and receiving apparatus 123 of the security device 120 and the security device 120', respectively, are formed to transparently pass data from the control device 30 and data from the sensor 80 to the field bus 60 to enable conventional, i.e. non-secure, communication between the control device 30 and the sensor 80. This can be useful if an existing, non-secure field bus system is to be converted to a secure field bus system. For this purpose, the security devices 120 and 120' are coupled to the field bus subscribers 30 and 80, which are not formed for a secure communication, and then connected to the field bus 60. Initially, security devices work transparently. At a later point in time, the corresponding security functions are then enabled in the security devices 120 and 120' in accordance with the security protocol.

Advantageously, the field bus subscriber 30 and the security device 120 coupled to it are managed in the field bus system 5 as a single field bus subscriber, for example by assigning a common address to the field bus subscriber 30 and the security device 120 coupled to it. In a similar way, a shared address can also be assigned to field bus subscriber 80 and the coupled security device 120'. In this way, the exemplary field bus system 5 can be considered as a field bus system with three field bus subscribers.

The invention claimed is:

1. A security device for supporting secure communication via a field bus comprising:
    a connecting apparatus for the direct coupling of the security device to a network interface of a field bus subscriber formed to be connected to a field bus, and which is not formed for secure communication via the field bus,
    wherein in the coupled state there is a link between the security device and the field bus subscriber such that, in the event of a disconnection or damage to the coupling, the proper operation of the security device is reversibly or irreversibly blocked,
    a network interface for connecting the security device to the field bus,
    a transmitting and receiving apparatus which is formed to securely transfer data coming from a directly coupled field bus subscriber, which is not formed for secure communication, via the field bus according to a predetermined security protocol, and which is further formed, according to the predetermined security protocol, to receive data transferred via the field bus and determined for the field bus subscriber and to deliver them to the field bus subscriber.

2. The security device according to claim 1, further comprising: a control apparatus and a monitoring apparatus formed for monitoring the link between the security device and a connected field bus subscriber, wherein the control apparatus is formed to block proper operation of the security device in response to an error signal from the monitoring apparatus.

3. The security device according to claim 1, wherein: the security device is integrated in a plug connector comprising an RJ45 plug.

4. The security device according to claim 1, wherein: the transmitting and receiving apparatus is formed for decrypting encrypted data received via the field bus and for encrypting data to be transferred from a connected field bus subscriber which is not formed for secure communication via the field bus.

5. The security device according to claim 1, wherein: the security device is formed for performing an authentication method and/or at least one cryptographic algorithm according to the predetermined security protocol.

6. The security device according to claim 1, further comprising:
    a secure storage apparatus for storing cryptographic keys.

7. The security device according to claim 6, further comprising:
    a control apparatus and a monitoring apparatus formed for monitoring the link between the security device and a connected field bus subscriber, wherein the control apparatus is formed to block proper operation of the security device in response to an error signal from the monitoring apparatus,
    wherein the control apparatus is formed, in response to an error signal from the monitoring apparatus, to erase at least one of the cryptographic keys and/or the connecting apparatus and/or to irreversibly or reversibly block the network interface of the security device.

8. The security device according to claim 1, wherein: the power supply of the security device is carried out via the field bus and/or by means of an internal power supply source and/or via a connected field bus subscriber and/or by means of energy harvesting.

9. The security device according to claim 1, wherein: the transmitting and receiving apparatus is formed to transparently pass data to the field bus from a connected field bus subscriber which is not formed for secure communication via the field bus.

10. The security device according to claim 1, further comprising:
    a field device or a control device that can be linked to the security device as a field bus subscriber.

11. The security device according to claim 1, wherein: the predetermined security protocol includes a plurality of defined security functions integrated into a field bus protocol.

12. A field bus system for the support of secure communication via a field bus comprising:
    a field bus,
    at least one first field bus subscriber which has a network interface formed for switching on the field bus, wherein the at least one first field bus subscriber is not formed for secure communication via the field bus,
    wherein the at least one first field bus subscriber is linked to a security device according to claim 1, wherein the security device is formed for secure communication according to a predetermined security protocol.

13. The field bus system according to claim 12, further comprising:
    at least one second field bus subscriber connected to the field bus and formed for a secure communication according to the predetermined security protocol with the security device to which the at least one first field bus subscriber is coupled.

14. The field bus system according to claim 12, further comprising: a non-detachable link between the at least one first field bus subscriber and the security device.

15. The field bus system according to claim 1, wherein: the at least one first field bus can be formed as a field device or control device and the at least one second field bus subscriber can be formed as a field device or control device.

* * * * *